US012791436B2

(12) United States Patent
Schwefe et al.

(10) Patent No.: US 12,791,436 B2
(45) Date of Patent: Nov. 10, 2026

(54) DEVICE AND METHOD FOR ASCERTAINING A LONGITUDINAL EXTENSION AND THE AVERAGE SPEED OF A BELT AND FOR ASCERTAINING THE SPEED OF AT LEAST ONE BELT PULLEY

(71) Applicant: ContiTech Antriebssysteme GmbH, Hannover (DE)

(72) Inventors: Thorsten Schwefe, Isernhagen (DE); Philipp Freiheit, Hannover (DE); Eduard Lorenz, Haste (DE)

(73) Assignee: CONTITECH DEUTSCHLAND GMBH, Hannover (DE)

( * ) Notice: Subject to any disclaimer, the term of this patent is extended or adjusted under 35 U.S.C. 154(b) by 323 days.

(21) Appl. No.: 18/551,862

(22) PCT Filed: Mar. 3, 2022

(86) PCT No.: PCT/DE2022/200035
§ 371 (c)(1),
(2) Date: Sep. 21, 2023

(87) PCT Pub. No.: WO2022/199760
PCT Pub. Date: Sep. 29, 2022

(65) Prior Publication Data
US 2024/0175780 A1 May 30, 2024

(30) Foreign Application Priority Data
Mar. 23, 2021 (DE) ..................... 10 2021 202 803.9

(51) Int. Cl.
*G01M 13/023* (2019.01)
*B65G 43/02* (2006.01)
(Continued)

(52) U.S. Cl.
CPC ........... *G01M 13/023* (2013.01); *B65G 43/02* (2013.01); *G01M 13/028* (2013.01); *G01P 3/64* (2013.01)

(58) Field of Classification Search
CPC .. G01M 13/023; G01M 13/028; B65G 43/02; G01P 3/64
(Continued)

(56) References Cited

U.S. PATENT DOCUMENTS 4,372,172 A * 2/1983 Gombocz ............ G01B 11/043 198/810.04
5,019,017 A 5/1991 Mönch
(Continued)

FOREIGN PATENT DOCUMENTS

DE 3005780 A1 2/1981
DE 202016008121 U1 4/2017
(Continued)

OTHER PUBLICATIONS

International Search Report dated Jun. 9, 2022 of International Application PCT/DE2022/200035 on which this application is based.

*Primary Examiner* — Peter J Macchiarolo
*Assistant Examiner* — Monica S Young
(74) *Attorney, Agent, or Firm* — Iken S. Sans; Richard A. Wolf; Gregory Adams

(57) ABSTRACT

The invention relates to a device for ascertaining a longitudinal extension and an average speed of a belt and for ascertaining a speed of at least one belt pulley, in which device at least one marking part pair is arranged respectively in the load strand and the idle strand over the circumference of the belt.

19 Claims, 1 Drawing Sheet

(51) Int. Cl.
*G01M 13/028* (2019.01)
*G01P 3/64* (2006.01)

(58) Field of Classification Search
USPC ........................................................ 73/593
See application file for complete search history.

(56) References Cited

U.S. PATENT DOCUMENTS

| | | | | | |
|---|---|---|---|---|---|
| 5,291,131 | A * | 3/1994 | Suzuki | G01B 11/043 | 324/206 |
| 9,228,909 | B1 * | 1/2016 | Rembisz | G01L 3/02 | |
| 2004/0154413 | A1 * | 8/2004 | Coy | G01M 13/023 | 73/862.453 |
| 2010/0131232 | A1 * | 5/2010 | Taylor | F02B 77/081 | 702/147 |
| 2018/0128352 | A1 | 5/2018 | Scholzen et al. | | |
| 2022/0205868 | A1 | 6/2022 | Fiss et al. | | |

FOREIGN PATENT DOCUMENTS

| | | | | |
|---|---|---|---|---|
| DE | 102018215478 | A1 | 3/2020 | |
| DE | 102019206169 | A1 | 11/2020 | |
| DE | 102021200478 | A1 * | 7/2022 | G01B 7/16 |
| EP | 0382115 | A2 | 8/1990 | |
| JP | 2025025699 | A * | 2/2025 | |
| WO | WO-02079747 | A2 * | 10/2002 | G01M 13/023 |

* cited by examiner

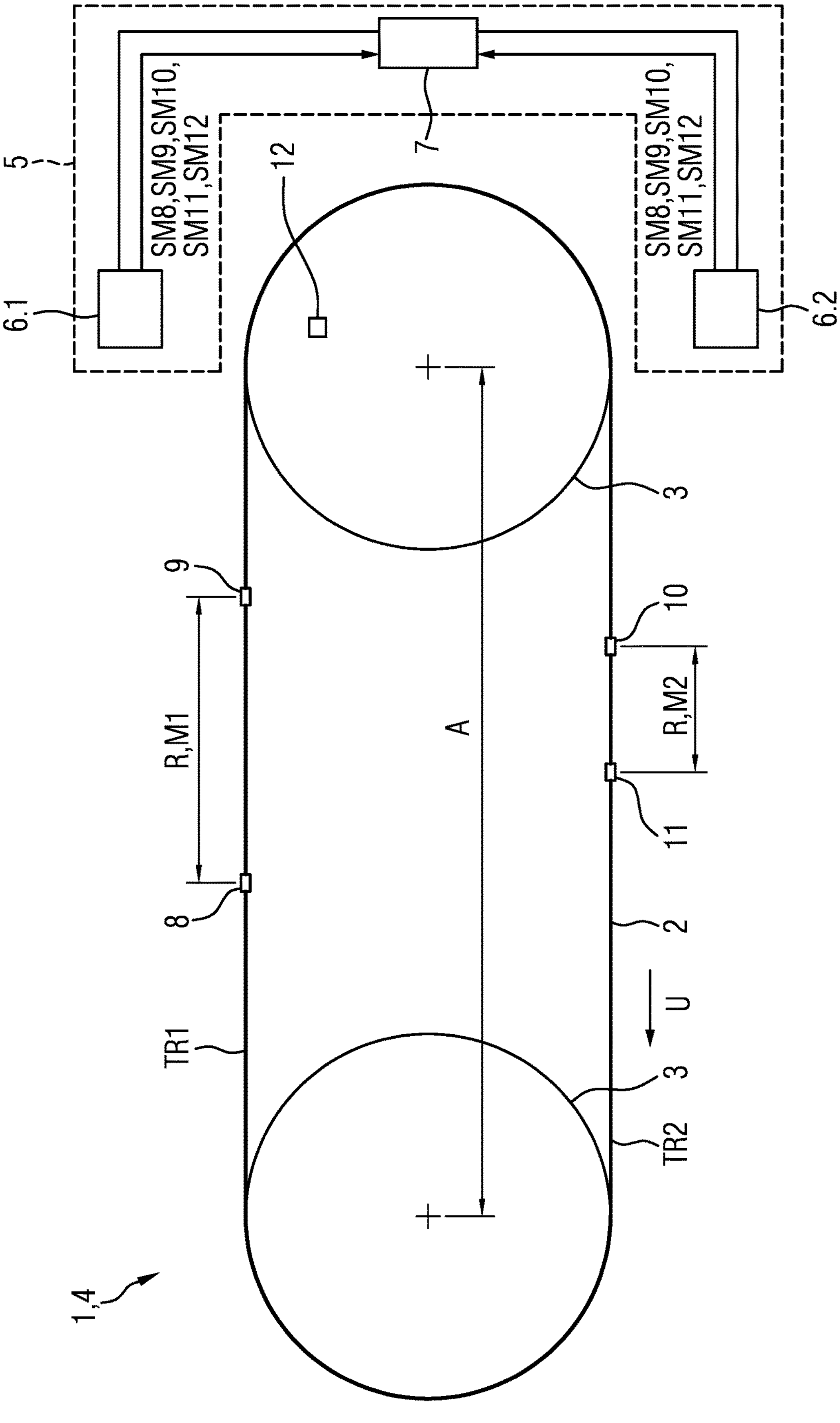
5
7
SM8,SM9,SM10,
SM11,SM12
SM8,SM9,SM10,
SM11,SM12
12
6.1
6.2
3
9
10
R,M1
A
R,M2
11
8
2
U
TR1
3
TR2
1,4

DEVICE AND METHOD FOR ASCERTAINING A LONGITUDINAL EXTENSION AND THE AVERAGE SPEED OF A BELT AND FOR ASCERTAINING THE SPEED OF AT LEAST ONE BELT PULLEY

TECHNICAL FIELD

The invention relates to a device for ascertaining a longitudinal extension and an average speed of a belt and for ascertaining a speed of at least one belt pulley.

The invention also relates to a method for ascertaining a longitudinal extension and speed of a belt and for ascertaining a speed of a belt pulley.

SUMMARY

Methods and devices which comprise a belt and a drive device for the belt are known in principle from the prior art. In this case, the drive device has a plurality of, for example two, belt pulleys. The belt is designed to revolve in a circumferential direction in the form of a ring and at least partially loops around the belt pulleys. In addition, the belt can be driven in the circumferential direction by the drive device. A belt is preferably a drive belt for transmitting tensile forces. In this case, a belt is often subjected to pretensioning, effective forces, centrifugal forces and/or bending.

The service life of a belt is at least partly determined by the extension of the belt, in particular the extension in the circumferential direction. The rate of circulation at which the belt moves and/or the power which is required to drive the belt can provide information about the loading on the belt. The extension of the belt is related to a reduction in the pretensioning force of the belt. To a certain extent, a reduction in pretensioning can be compensated for by clamping systems that can optionally be used. However, belt drives without a clamping system are particularly susceptible to a reduction in pretensioning, which manifests itself as immediately greater slip of the belt in relation to the belt pulley, in particular in frictionally engaged belt drives, this increasing the temperature in the belt and the wear of the belt.

Toothed belts are known as drive belts, as are flat belts, V-belts or V-ribbed belts.

DE102018215478A1 discloses a system for ascertaining a longitudinal extension of a belt. The system comprises the belt, a drive device, a transmitter and an evaluation unit. Two ferromagnetic marking parts arranged with a predetermined spacing from each other are embedded in the belt. The transmitter is designed to generate a reference alternating field, which is changed by each of the two marking parts when the respective marking part is moved through the reference alternating field as the belt revolves. The change in the reference alternating field that is produced by the corresponding interaction between the respective marking part and the reference alternating field can be captured by the transmitter. The evaluation unit is designed to ascertain a longitudinal extension of the belt based on the reference spacing of the ferromagnetic marking parts, the belt speed, the first capture time and the second capture time. It is particularly disadvantageous here that only one measurement can be performed per revolution of the belt. The accuracy of the measurement can be adversely affected by this circumstance. A simultaneous slip measurement is not possible with this system because the rotation speeds of the drive rotor and the belt pulley are not monitored. This requires additional measuring devices, which has a negative effect on the complexity of the measurement system and the costs. Furthermore, prior calibration of the system is required by way of a reference spacing being defined by adapting the spacing of the transmitters to the spacing of the marking parts in the non-loaded state of the belt. This requires additional manual adjustment effort and increases the risk of measurement inaccuracies if the spacing between sensors changes as a result of vibrations, for example.

DE 20 2016 008 121 U1 discloses a belt drive consisting of a belt pulley, a belt and a monitoring device. A marking is applied both to the belt and to the belt pulley. A signal is triggered when the markings on the belt and on the drive pulley are opposite each other. The markings for identifying the position can be based on various sensor technologies, e.g based on optical, inductive, capacitive or magnetic effects.

The monitoring described there can be used to monitor, inter alia, the number of revolutions over the service life of toothed or synchronous belts.

A similar method is described in DE 10 2019 206 169 A1, which describes a method for monitoring a belt drive. Here, the belt has at least one first marking and at least one first sensor element assigned to the belt. Furthermore, the rotor of the drive motor has a further marking and a sensor element assigned to the drive motor. In particular, the monitoring method is used to monitor a visually inaccessible belt drive for steering systems for skipped teeth by way of an angular offset between the belt and the belt pulley being detected.

In the abovementioned specifications, there is disadvantageously no parallel force measurement on the belt, which may be necessary for complete monitoring of the belt drive system.

The invention addresses the problem of providing a device and a method for measuring force and slip on drive belts using a common sensor system. In particular, the problem is that of implementing slip control of the drive belt using the device and/or the method. In addition, the generated information about the transmission of power and the slip of the drive belt should be used to identify irregularities or signs of wear in the drive system or the working machine driven by this drive system at an early stage and before component failure begins.

Solution to the Problem

The solution to this problem is achieved by a device that determines an extension and speed of a belt and also determines a speed of a belt pulley.

Further advantageous embodiments are disclosed in the dependent claims.

Advantages of the Invention

A device according to the invention is provided for ascertaining a longitudinal extension and an average speed of a belt and for ascertaining a speed of at least one belt pulley. Here, the device comprises the belt of predetermined longitudinal stiffness, wherein the length of the belt is constant irrespective of the operating state. The belt has at least a first marking part, a second marking part, a third marking part and a fourth marking part, wherein the first and the second marking part are designed to form a first marking part pair and the third and fourth marking part are designed to form a second marking part pair.

The assignment of the marking parts to marking part pairs can render it possible, for example, for the states of the belt to be monitored in sections.

Also provided is a drive device having at least two belt pulleys of predetermined diameter which are arranged with an axis spacing from each other and around which the belt is at least partially looped, and a transmission device comprising at least two external readers and an evaluation and control unit which is suitable for controlling the rotation speed and/or the torque of the drive device, wherein, as the belt revolves, signals identifiable at the external readers can be generated by each marking part and can be output to the evaluation and control unit.

Each of the marking parts of the marking part pairs can also transmit an identification identifier, whereby the transmitted signal captured by one of the external readers can be assigned to each individual marking part. By assigning the signals to the individual marking parts, an assignment of the signals of the marking parts to marking part pairs can advantageously be performed first. Accordingly, each of the marking parts of the marking part pairs can be both detected and identified by each of the external readers.

The belt is designed to revolve in a circumferential direction in the form of a ring and is driven by the drive device in the circumferential direction, wherein the belt has a load-transmitting belt strand, also called a load strand, and an idle strand arranged opposite to the load strand.

In other words, the force ratios in the belt strands change when power is transmitted by the belt. Power introduced into the load strand of the belt by the belt pulley, which is connected to a drive motor, and to be transmitted leads to an increase in force in the load strand, and this increase in force causes an elongation of the belt in the load strand, depending on the stiffness of the belt. The increase in force in the load strand leads to a reduction in force of the same amount in the idle strand, with a shortening of the idle strand depending on the stiffness of the belt. This condition applies provided that the idle strand has a pretensioning force of >0 Newton. The sum of the forces in the belt and the length of the belt therefore remain constant even during operation under dynamic load.

In a state without power transmission, the marking parts of the marking part pairs of the belt are each arranged one behind the other in the circumferential direction with a predetermined reference spacing.

The non-loaded state is to be understood as a static state without power transmission by the belt. The belt may already be statically pretensioned in this state.

The reference spacing of the marking parts of the first marking part pair is designed to change into a first measurement spacing when power is transmitted by the belt, wherein the reference spacing of the marking parts of the second marking part pair is designed to change into a second measurement spacing when power is transmitted by the belt.

As previously explained, power transmission causes an increase in force and an extension in the load strand, as well as a reduction in force and a shortening in the idle strand.

In other words, according to Hooke's law, there is a proportional relationship between a change in force and length in the load strand and idle strand. The sum of the forces in the belt and the length of the belt therefore remain constant even during operation under dynamic load.

Furthermore, at least one of the belt pulleys has at least one marking part, wherein, as the belt pulley rotates, the marking part of the belt pulley is designed to generate an identifiable signal at one of the external readers and output it to the evaluation and control unit.

It is also true of the marking part of the belt pulley that, as described at the outset, in addition to the signal for assigning the signal to the marking part, an identification identifier can also be transmitted to the external reader.

The transmission device is arranged without contact with the belt in such a way that the marking parts of the marking part pairs of the belt and the belt pulley can be guided past the transmission device in succession. The evaluation and control unit is configured to ascertain a respective running time from in each case two signals. In other words, the running time can be ascertained as the time difference between two captured signals of the marking parts.

The evaluation and control unit is configured to ascertain an average speed of the belt based on the ascertained running time of one of the marking parts of the marking part pairs over the circumferential length over one revolution of the belt. Furthermore, the evaluation and control unit is configured to ascertain a speed of the belt pulley based on the ascertained running time of the marking part of the belt pulley.

As described at the outset, the length of the belt is predetermined and constant. While the length in the belt strands can change in sections due to dynamic load stress, the overall length of the belt remains constant due to the explained relationship between the balance of forces in the overall belt drive. Therefore, the average speed of the belt can be ascertained via the ascertained running times of the marking parts as the belt revolves and the predetermined belt length.

The belt pulley likewise has a predetermined diameter. The speed of the belt pulley can be ascertained in the same way as explained in the example of the belt.

The belt has a force-transmitting belt strand, also called a load strand, and a load-free belt strand, also called an idle strand. The load and/or idle strand extend/extends over the region between two belt pulleys. In the case of a belt drive with two belt pulleys, the load strand and idle strand are arranged opposite each other and have an identical strand length. In a state without power transmission by the belt drive, the load strand and idle strand have identical force ratios. These are essentially due to a static pretensioning force with which the drive belt is tensioned between the belt pulleys. The static pretensioning force of the belt is required for reliable power transmission and can be selected and adjusted as required in accordance with the requirements made in respect of the power to be transmitted by the belt.

According to one aspect of the device according to the invention, in a state of the belt without power transmission, at least one marking part pair formed from the marking parts is arranged respectively in the load strand and the idle strand over the circumference of the belt. The assignment of the marking parts to marking part pairs can advantageously render possible monitoring of the states of the belt in the load strand and idle strand if one of the marking part pairs is arranged in each case in the load strand and one in the idle strand.

It has proven particularly advantageous here that, according to the invention, both the load strand and the idle strand each have at least one marking part pair formed from the marking parts in a state of the belt without power transmission. In this way, information relating to the load strand and idle strand can be provided permanently and compared.

Furthermore, the evaluation and control unit is configured to ascertain a longitudinal extension of the belt based on the average belt speed, the difference between the running times of the two consecutive marking parts of the marking part pairs of the belt both in the load strand and in the idle strand, and the measurement spacing ascertained therefrom of the marking parts of the marking part pairs from each other both in the load strand and in the idle strand, and the reference spacing as an average value of the ascertained measurement spacings.

In other words, the evaluation and control unit can ascertain a longitudinal extension of the belt. For this purpose, the external readers can capture signals as the marking parts pass. Owing to the predetermined circumferential length of the belt stored in the evaluation and control unit, the average belt speed can be ascertained on the basis of the running time of a marking part between a first signal at an external reader and a second signal at an external reader after one revolution of the belt. Furthermore, the evaluation and control unit is configured to ascertain a measurement spacing of the marking parts of the marking part pairs from each other both in the load strand and in the idle strand based on the running times of the two consecutive marking parts of the marking part pairs of the belt both in the load strand and in the idle strand. In other words, the measurement spacing corresponds to the spacing of the marking parts of the marking part pairs during dynamic operation. As soon as the belt transmits a power, the spacing of the marking parts of the marking part pairs changes in such a way that the measurement spacing of the marking parts of the marking part pair in the load strand increases, while the measurement spacing of the marking parts of the marking part pair in the idle strand decreases by the same amount. An increase in the measurement spacing of the marking parts of the marking part pair in the load strand therefore always also requires an identical reduction in the measurement spacing of the marking parts of the marking part pair in the idle strand.

Owing to the described dependence of the change in measurement spacing of the marking parts of the marking part pairs in the load strand and idle strand, the reference spacing can be ascertained as an average value of the ascertained measurement spacings. The longitudinal extension of the belt can be ascertained using the evaluation and control unit taking into account the average belt speed, the ascertained measurement spacing of the marking parts of the marking part pairs from each other both in the load strand and in the idle strand as well as the reference spacing.

The evaluation and control unit is designed to be able to ascertain a tensile force and difference in tensile force in the load strand of the belt via a spring stiffness assigned to the belt and stored in the evaluation and control unit and a difference in spacing of the marking parts of the marking part pairs of the belt in the load strand. The information relating to spring stiffness can also be provided, for example, via a scannable barcode on the belt.

In other words, the difference in tensile force in the load strand can be ascertained by multiplying the spring stiffness of the belt by the difference in spacing of the marking parts of the marking part pairs assigned to the load strand. The difference in tensile force can correspond here to the force component which is added to the static pretensioning force by the drive power introduced into the belt drive via the drive belt pulley. A total force that prevails in the load strand can be ascertained from the sum of the static pretensioning force and the difference in tensile force.

Furthermore, the evaluation and control unit is also configured to be able to ascertain slip between the belt and the belt pulley based on the ratio of the average speeds ascertained from the belt and the belt pulley. In other words, both the speed of the belt pulley and the average speed of the belt can be monitored by the evaluation and control unit. A difference in speed between the belt pulley and the belt means there is slip between the belt and the belt pulley. Depending on the application, slip of the belt can be tolerated or can even be necessary, in particular in frictionally engaged drive belts in the form of V-belts or V-ribbed belts. However, excessive slip can lead to increased wear as a result of abrasion or an excessive temperature. The cause of increased slip may be pretensioning of the belt that is too low for the drive power to be transmitted. The slip measurement described can advantageously be used to provide an early indication that pretensioning of the belt is too low, and this can prevent sustained damage to or failure of the belt.

Overall, it has proven particularly advantageous that just one sensor system can be used to both ascertain a longitudinal extension of the belt and measure the average speed of a belt and a belt pulley. In this way, a large number of measurement values can be obtained in a particularly cost-effective manner.

According to a further aspect of the device according to the invention, the marking parts are designed as surface acoustic wave sensors. Surface acoustic wave sensors, SAW sensors for short, can be particularly advantageously suited for use in belt drives since they can withstand the high temperatures of, in some cases, more than 200° C. prevailing during vulcanization of the belt and can also reliably operate at a high belt speed due to a low energy requirement for sending a sensor protocol. Here, an external reader is assigned to the SAW sensors located on or in the belt and can be, for example, permanently installed on a machine frame and can be arranged radially or axially spaced apart from the belt. The external reader can emit an electromagnetic field which, when a SAW sensor passes, provides the SAW sensor with the energy required to transmit a sensor protocol. The sensor protocol transmitted to the external reader by the SAW sensor can be provided with an identification, so that even if a plurality of sensors are present, the sensor protocols can be assigned to the individual sensors.

According to a further aspect of the device according to the invention, the marking parts are designed as a radio frequency identification transponder, RFID transponder for short. This can particularly advantageously represent a cost-effective alternative to the SAW sensors described above.

According to a further advantageous embodiment of the device according to the invention, the marking parts are designed as ferromagnetic marking parts. In a particularly advantageous manner, the marking parts can be designed in such a way that ferromagnetic particles are introduced into the elastomer of a belt. In this way, a homogeneous material distribution can be achieved in the belt without foreign objects in the form of a sensor element being able to weaken the belt and cause damage to the belt.

According to a further aspect of the device according to the invention, the driven belt pulley has at least one marking part. This can be very particularly advantageous if, for example, the rotation speed of the drive motor coupled to the belt pulley is to be monitored via the marking part of the belt pulley. In this way, the rotation speed of the drive motor can be monitored directly and without any further transmission elements which are coupled therebetween and corrupt the measurement result.

According to a further aspect of the device according to the invention, one of the external readers is arranged in the region of the inlet and one in the region of the outlet of the belt into/out of the belt pulley. This can advantageously ensure that an external reader is assigned to the load strand and idle strand in each case. By way of arranging the external readers in the direct vicinity of a belt pulley, precise signal capture can be performed since the belt strand is not yet subject to a large vibration amplitude in this region.

Excessive vibrations of the belt strand can adversely affect signal capture due to varying spacings between the external reader and the marking part.

According to a further aspect of the device according to the invention, it has proven to be particularly advantageous that, when predetermined limit values for a difference in speed between the belt and the belt pulley stored in the evaluation and control unit are exceeded, the evaluation and control unit is configured to be able to control the drive torque or the drive speed in such a way that the difference in speed moves to within defined limit values. In other words, permissible limit values for the slip between the belt and the belt pulley can be stored in the evaluation and control unit. The belt speed can be ascertained at least once per revolution of the belt, depending on the number of marking parts of the marking part pairs of the belt, and compared or set in a ratio with the speed of the belt pulley. A difference in speed ascertained therefrom or ascertained slip can then be compared with the stored limit value. If the difference in speed between the belt and the belt pulley should exceed the defined limit value, the drive speed or the drive torque can be reduced. Amongst the adjusted performance data, further recording of the speed values of the belt and the belt pulley can be performed, and the result can once again be compared for compliance with the defined limit value for the slip. If necessary, further power adjustments of the drive can follow until the slip moves to within the defined limit value. In this way, increased wear of the belt as a result of high temperatures due to excessive slip can be advantageously prevented.

According to a further aspect of the device according to the invention, the evaluation and control unit is coupled to further measuring devices of machine elements. For this purpose, the evaluation and control unit comprises a memory for backing up historical sensor data and for backing up historical force profile data relating to the belt. Furthermore, the evaluation and control unit is designed to be able to monitor the historical force profile data relating to the belt within prespecified limit values stored in the memory of the evaluation and control unit and, taking into account the historical sensor data relating to further machine elements from the memory of the evaluation and control unit, to be able to draw a conclusion about the wear of machine elements outside the device.

In other words, the evaluation and control unit comprises a memory which, in addition to the above-described sensor data relating to the device, can back up further sensor data relating to measuring devices of other machine elements. These captured sensor data can be stored in a memory in order to monitor long-term changes. In particular, consideration of the change in the force profile data relating to the belt in connection with further sensor data from measuring devices of other machine elements may be of high importance.

This can be explained using the example of an attachment of an agricultural machine. The attachment may be a cutting unit of a combine harvester. Advantageously, the harvest volume per unit time can be recorded by a measuring device of the cutting unit. For example, wear of the blades of the cutting unit driven by the belt can be identified by comparing the force profile data relating to the belt, which can be ascertained by the device according to the invention, with the profile of the harvest volume per unit time of the cutting unit. If, for example, the force in the belt increases while the harvest volume decreases, the blades may be blunt or damaged, and accordingly a conclusion can be drawn about the need to change the blades.

A further advantageous embodiment provides an attachment of an agricultural machine having at least one device according to the invention for monitoring devices driven by belts. In this way, the advantages explained above can be used in various belt drive systems. In particular, high availability during the harvesting period is targeted for agricultural machines. Therefore, the avoidance of wear-related machine failure is of particularly high importance, and therefore monitoring of belt drives can be of particularly high relevance.

A further advantageous embodiment provides a method for ascertaining a longitudinal extension and an average speed of a belt and for ascertaining the speed of at least one belt pulley.

The belt of a predetermined longitudinal stiffness is provided for this purpose, wherein the length of the belt is constant irrespective of the operating state.

The belt has at least a first marking part, a second marking part, a third marking part and a fourth marking part, wherein the first and the second marking part form a first marking part pair and the third and fourth marking part form a second marking part pair. The assignment of the marking parts to marking part pairs can render it possible, for example, for the states of the belt to be monitored in sections.

Also provided is a drive device having at least two belt pulleys of predetermined diameter which are arranged with an axis spacing from each other and around which the belt is at least partially looped, and a transmission device comprising at least two external readers and an evaluation and control unit which controls the rotation speed and/or the torque of the drive device, wherein, as the belt revolves, signals identifiable at the external readers are generated by each marking part and are output to the evaluation and control unit. In other words, each of the marking parts of the marking part pairs can also transmit an identification identifier, whereby the transmitted signal captured by one of the external readers can be assigned to each individual marking part. By assigning the signals to the individual marking parts, an assignment of the signals of the marking parts to marking part pairs can advantageously be performed first. Accordingly, each of the marking parts of the marking part pairs can be both detected and identified by each of the external readers.

The belt revolves around the belt pulleys in a circumferential direction in the form of a ring and is driven by the drive device in the circumferential direction, wherein the belt has a load-transmitting belt strand, also called a load strand, and an idle strand arranged opposite to the load strand.

In other words, the force ratios in the belt strands change when power is transmitted by the belt. Power introduced into the load strand of the belt by the belt pulley, which is connected to a drive motor, and to be transmitted leads to an increase in force in the load strand, and this increase in force causes an elongation of the belt in the load strand, depending on the stiffness of the belt. The increase in force in the load strand leads to a reduction in force of the same amount in the idle strand, with a shortening of the idle strand depending on the stiffness of the belt. This condition applies provided that the idle strand has a pretensioning force of >0 Newton. The sum of the forces in the belt and the length of the belt therefore remains constant even during operation under dynamic load.

In a state without power transmission, the marking parts of the marking part pairs of the belt are each arranged one behind the other in the circumferential direction with a predetermined reference spacing in a non-loaded state of the belt. The non-loaded state is to be understood as a static state without power transmission by the belt. The belt may already be statically pretensioned in this state.

The reference spacing of the marking parts of the first marking part pair changes into a first measurement spacing when power is transmitted by the belt, wherein the reference spacing of the marking parts of the second marking part pair changes into a second measurement spacing when power is transmitted by the belt.

As previously explained, power transmission causes an increase in force and an extension in the load strand, as well as a reduction in force and a shortening in the idle strand.

In other words, according to Hooke's law, there is a proportional relationship between a change in force and length in the load strand and idle strand. The sum of the forces in the belt and the length of the belt therefore remains constant even during operation under dynamic load.

Furthermore, at least one of the belt pulleys has at least one marking part, wherein, as the belt pulley rotates, the marking part of the belt pulley generates an identifiable signal at one of the external readers and outputs it to the evaluation and control unit. It is also true of the marking part of the belt pulley that, as described at the outset, in addition to the signal for assigning the signal to the marking part, an identification identifier can also be transmitted to the external reader.

The transmission device is arranged without contact with the belt in such a way that the marking parts of the marking part pairs of the belt and the belt pulley are guided past the transmission device in succession. The evaluation and control unit then ascertains a running time from two signals in each case.

The evaluation and control unit then ascertains an average speed of the belt and a speed of the belt pulley from the running times.

As described at the outset, the length of the belt is predetermined and constant. While the length in the belt strands can change in sections due to dynamic load stress, the overall length of the belt remains constant due to the explained relationship between the balance of forces in the overall belt drive. Therefore, the average speed of the belt can be ascertained via the ascertained running times of the marking parts during one revolution of the belt and the predetermined belt length.

The belt pulley also has a predetermined diameter. The speed of the belt pulley can be ascertained in the same way as explained in the example of the belt as the belt pulley rotates.

The method according to the invention is characterized by the following method steps:

a) generating a signal from the first marking part of the belt at the first external reader,
b) generating a signal from the second marking part of the belt at the first external reader,
c) generating a signal from the third marking part of the belt at the first external reader,
d) generating a signal from the fourth marking part of the belt at the first external reader,
e) generating a signal from the first marking part of the belt at the second external reader,
f) generating a signal from the second marking part of the belt at the second external reader,
g) generating a signal from the third marking part of the belt at the second external reader,
h) generating a signal from the fourth marking part of the belt at the second external reader,
i) ascertaining a running time from in each case two signals using the evaluation and control unit,
j) ascertaining the average speed of the belt using the evaluation and control unit based on the ascertained running time of one of the marking parts of the marking part pairs over the circumferential length over one revolution of the belt,
k) ascertaining the difference between the running times of the two consecutive marking parts of the marking part pairs of the belt at the external reader assigned to the load strand using the evaluation and control unit,
l) ascertaining the measurement spacing of the two consecutive marking parts of the marking part pairs in the load strand via the ascertained average speed of the belt and the ascertained difference between the running times of the two consecutive marking parts of the marking part pairs of the belt,
m) ascertaining the difference between the running times of the two consecutive marking parts of the marking part pairs of the belt at the external reader assigned to the idle strand using the evaluation and control unit,
n) ascertaining the measurement spacing of the two consecutive marking parts of the marking part pairs in the idle strand via the ascertained average speed of the belt and the ascertained difference between the running times of the two consecutive marking parts of the marking part pairs of the belt,
o) ascertaining the difference in spacing of the two consecutive marking parts of the marking part pairs of the belt in the load strand and in the idle strand using the evaluation and control unit,
p) ascertaining the reference spacing of the two consecutive marking parts of the marking part pairs of the belt using the evaluation and control unit via the ascertained measurement spacings of the two consecutive marking parts of the marking part pairs of the belt in the load strand and in the idle strand by averaging the measurement spacings,
q) ascertaining the longitudinal extension in the load strand of the belt using the evaluation and control unit via the ascertained measurement spacing of the two consecutive marking parts of the marking part pairs of the belt in the load strand and the ascertained reference spacing,
r) ascertaining the tensile force and difference in tensile force in the load strand of the belt using the evaluation and control unit via a spring stiffness assigned to the belt and stored in the evaluation and control unit and the difference in spacing of the two consecutive marking parts of the marking part pairs of the belt in the load strand,
s) generating a signal from the marking part of the belt pulley at one of the external readers,
t) ascertaining a running time of the marking part of the belt pulley from two signals using the evaluation and control unit,
u) ascertaining the speed of the belt pulley using the evaluation and control unit based on the ascertained running time of the marking part of the belt pulley over the defined circumference of the belt pulley,
v) ascertaining the slip between the belt and the belt pulley using the evaluation and control unit, based on the ascertained speeds of the belt and the belt pulley.

In other words, each of the external readers can record, at the time at which a marking part passes, a change in, for example, an electromagnetic field emitted by the external reader and defined as the signal from the respective marking part. The assignment of the signal to the marking part can be performed as described at the outset via the individual identification mark of the respective marking part.

The method according to the invention particularly advantageously means that one sensor system can be used for both force measurement as well as speed and slip measurement of a plurality of components of a belt drive, specifically the belt and the belt pulley. This method can be realized particularly cost-effectively since several measurements can be carried out with joint use of components.

According to a further aspect of the method according to the invention, it has proven to be particularly advantageous that, when predetermined limit values for a difference in speed between the belt and the belt pulley stored in the evaluation and control unit are exceeded, the evaluation and control unit controls the drive torque or the drive speed in such a way that the difference in speed moves to within defined limit values. In other words, permissible limit values for the slip between the belt and the belt pulley can be stored in the evaluation and control unit. The belt speed can be ascertained at least once per revolution of the belt, depending on the number of marking parts of the marking part pairs of the belt, and compared or set in a ratio with the speed of the belt pulley. A difference in speed ascertained therefrom or ascertained slip can then be compared with the stored limit value. If the difference in speed between the belt and the belt pulley should exceed the defined limit value, the drive speed or the drive torque can be reduced. Amongst the adjusted performance data, further recording of the speed values of the belt and the belt pulley can be performed, and the result can once again be compared for compliance with the defined limit value for the slip. If necessary, further power adjustments of the drive can follow until the slip moves to within the defined limit value. In this way, increased wear of the belt as a result of high temperatures due to excessive slip can be advantageously prevented.

According to a further aspect of the method according to the invention, the evaluation and control unit backs up historical force profile data relating to the belt and further historical sensor data from measuring devices of further machine elements in a memory and stores them there.

The historical force profile data relating to the belt are monitored within prespecified limit values stored in the memory of the evaluation and control unit, wherein, taking into account otherwise ascertained historical sensor data relating to further machine elements from the memory of the evaluation and control unit, a conclusion is drawn about the wear of machine elements outside the device. These sensor data can be stored permanently and over a long period of time for historical traceability. In addition, the likewise stored historical force profile data relating to the belt can be assigned to these historical sensor data.

In other words, further sensor data from measuring devices of other machine elements belonging to a drive machine can be stored in a memory of the evaluation and control unit. Permissible limit values for the belt force can be stored in the evaluation and control unit. By comparing the currently ascertained forces in the belt with the stored limit values, irregularities can be determined if the permissible limit values are exceeded. If the permissible limit values are transgressed, a warning signal can be output by the evaluation and control unit. Taking into account otherwise ascertained historical sensor data relating to further machine elements, a correlation between the change in belt forces and the change in the further sensor data can be established. In particular, consideration of the change in the force profile data relating to the belt in connection with further sensor data from measuring devices of other machine elements may be of high importance.

This can be explained using the example of an attachment of an agricultural machine. The attachment may be a cutting unit of a combine harvester. Advantageously, the harvest volume per unit time can be recorded by a measuring device of the cutting unit. For example, wear of the blades of the cutting unit driven by the belt can be identified by comparing the force profile data relating to the belt, which can be ascertained by the method according to the invention, with the profile of the harvest volume per unit time of the cutting unit. If, for example, the force in the belt increases while the harvest volume decreases, the blades may be blunt or damaged, and accordingly a conclusion can be drawn about the need to change the blades.

According to a further aspect, the use of the method according to the invention for monitoring belt-driven devices on attachments of an agricultural machine is provided. In this way, the advantages explained above of sensor monitoring can be transferred to agricultural machines. In particular, high availability during the harvesting period is targeted for agricultural machines. Therefore, the avoidance of wear-related machine failure is of particularly high importance, and therefore monitoring of belt drives can be of particularly high relevance.

BRIEF DESCRIPTION OF THE DRAWINGS

An exemplary embodiment of the invention will be explained in more detail below with reference to the drawing.

FIG. 1 shows a schematic view of an advantageous configuration of the device.

DETAILED DESCRIPTION

An advantageous configuration of the device 1 is schematically illustrated in FIG. 1. The device 1 comprises a belt 2 of predetermined longitudinal stiffness and a drive device 4 with, for example, two belt pulleys 3 of predetermined diameter which are arranged with an axis spacing A from each other. One of the two belt pulleys 3 is coupled as a driven belt pulley to a motor of the drive device 4. The belt 2 is designed to revolve in a circumferential direction U in the form of a ring and partially loops around each of the two belt pulleys 3. The belt 2 is driven by the drive device 4 with the two belt pulleys 3, so that the belt 2 revolves in the circumferential direction U.

The belt 2 has a base material and at least one reinforcement. For example, the base material may be partially or completely formed from rubber material, or partially or completely formed from polyurethane material. However, other materials for the base material may also be provided. The base material is preferably electrically insulating. The reinforcement is embedded in the base material as a continuous cord helically wound in the circumferential direction U. The reinforcement is used to transfer forces in the circumferential direction U of the belt 2. The reinforcement may be formed, for example, from a metal wire or from a plastic filament strand, such as a plastic fiber strand composed of polyamide for example. The individual turns of the cord forming the reinforcement in the transverse direction of the belt 2 can be arranged distributed in relation to each other. In this case, each of the turns extends in the circumferential direction U. The length of the belt 2 is constant irrespective of the operating state.

The belt 2 also has at least a first marking part 8, a second marking part 9, a third marking part 10 and a fourth marking part 11. In one embodiment, the marking parts 8, 9, 10, 11 are formed as SAW sensors and embedded into the base material of the belt. SAW sensors are particularly highly suitable for uses in a belt 2 since they withstand the required temperatures during production of the belt 2 and require only little energy for wireless data transmission of the sensor signals, and this allows them to be used at high relative speeds between the sensor and the associated external reader 6.1, 6.2. Here, the first marking part 8 and the second marking part 9 form a first marking part pair, while the third marking part 10 and the fourth marking part 11 form a second marking part pair. The first and the second marking part pair are arranged such that, in the idle state of the belt 2 without power transmission, one marking part pair is located in the load strand TR1 and one in the idle strand TR2. In the state of the belt 2 without power transmission, the marking parts 8, 9 and 10, 11 of the marking part pairs are each arranged one behind the other in the circumferential direction U with a predetermined reference spacing R. The reference spacing R changes into a first measurement spacing M1 of the marking parts 8, 9 of the first marking part pair and into a second measurement spacing M2 of the marking parts 10, 11 of the second marking part pair when power is transmitted by the belt 2.

Furthermore, one of the belt pulleys 3, which is preferably driven by a motor, also has a marking part 12 in the form of a SAW sensor.

A transmission device 5 comprises two external readers 6.1, 6.2 and an evaluation and control unit 7. One of the external readers 6.1, 6.2 is arranged in the region of the inlet and one in the region of the outlet of the belt 2 into and, respectively, out of the belt pulley 3 comprising the marking part 12. The transmission device 5 is arranged without contact with the belt 2 and the belt pulley 3, so that the marking parts 8, 9, 10, 11 of the marking part pairs of the belt 2 and the marking part 12 of the belt pulley 3 are guided past the transmission device 5 in succession. The marking parts 8, 9, 10, 11 of the marking part pairs of the belt 2 are detected by the external readers 6.1, 6.2 and identified on the basis of an individual identification of each individual marking part 8, 9, 10, 11 and output as a signal SM8, SM9, SM10, SM11 by the external readers 6.1, 6.2 to the evaluation and control unit 7.

Similarly, as the belt pulley 3 rotates, the marking part 12 is detected and identified by one of the external readers 6.1, 6.2 and output as a signal SM12 to the evaluation and control unit 7.

Here, each of the external readers 6.1, 6.2 is configured to capture the signals SM8, SM9, SM10, SM11, SM12.

The evaluation and control unit 7 is configured to ascertain a respective running time from in each case two signals SM8, SM9, SM10, SM11, SM12.

Furthermore, the evaluation and control unit 7 is configured to ascertain an average speed V2 of the belt 2 based on the ascertained running time TR of one of the marking parts 8, 9, 10, 11 of the marking part pairs over the circumferential length LR over one revolution of the belt 2 and a speed V3 of the belt pulley 3 based on the ascertained running time TS of the marking part 12 over the defined circumference LS of the belt pulley 3 stored in the evaluation and control unit 7.

$$V2 = \frac{LR}{TR}$$

-continued $$V3 = \frac{LS}{TS}$$

By way of ascertaining the difference between the running times dTR of the two consecutive marking parts 8, 9 of the marking part pair in the load strand TR1 and the marking parts 10, 11 of the marking part pair in the idle strand TR2 of the belt 2, a first measurement spacing M1 of the marking parts 8, 9 of the first marking part pair and a second measurement spacing M2 of the marking parts 10, 11 of the second marking part pair can be ascertained together with the average belt speed V2. The difference between the running times dTR of the marking parts 8, 9 of the first marking part pair assigned to the load strand TR1 and the difference between the running times dTR of the marking parts 10, 11 of the second marking part pair assigned to the idle strand TR2 are ascertained respectively via the external reader 6.1 which is assigned to the load strand TR1 and outputs the signals SM8, SM9 to the evaluation and control unit 7 and the external reader 6.2 which is assigned to the idle strand TR2 and outputs the signals SM10, SM11 to the evaluation and control unit 7.

$$M = V2 * dTR$$

A difference in spacing dM of the two consecutive marking parts 8, 9 of the first marking part pair in the load strand TR1 and of the two consecutive marking parts 10, 11 of the second marking part pair in the idle strand TR2 from each other is ascertained from the ascertained measurement spacings M1 and M2 using the evaluation and control unit 7. The reference spacing R of the two consecutive marking parts 8, 9 of the first marking part pair in the load strand TR1 and the two consecutive marking parts 10, 11 of the second marking part pair in the idle strand TR2 is ascertained using the evaluation and control unit 7 by averaging the measurement spacings M1 and M2.

$$dM = M1 - M2$$

$$R = \frac{dM}{2}$$

In a next method step, the longitudinal extension ε of the belt 2 in the load strand TR1 is ascertained using the evaluation and control unit 7 based on the previously ascertained measurement spacing M1 and the reference spacing R.

$$\varepsilon = M1 - R$$

In a further method step, a tensile force Fz and a difference in tensile force dFz are ascertained using the evaluation and control unit 7.

Here, the difference in tensile force dFz corresponds to the force component which is added to the static pretensioning force by the drive power introduced into the belt drive via the drive belt pulley 3. For this purpose, a spring stiffness D individually assigned to the respective belt is stored in the evaluation and control unit 7. The spring stiffness D is dependent on the belt specification and has to be stored once in the evaluation and control unit 7 when setting up the machine. The information relating to spring stiffness can also be provided, for example, via a scannable barcode on the belt. Furthermore, the measurement spacing M1 should be used as the basis of the calculation for ascertaining the tensile force Fz and, respectively, the difference in spacing dM should be used as the basis of the calculation for ascertaining the difference in tensile force dFz.

$$Fz=D*M1$$

$$dFz=D*\varepsilon$$

Furthermore, the evaluation and control unit 7 is intended to ascertain slip V4 between the belt 2 and the belt pulley 3, based on the ascertained speeds V2, V3 of the belt 2 and the belt pulley 3.

$$V4=\frac{V3}{V2}-1$$

LIST OF REFERENCE SIGNS

1 Device
2 Belt
3 Belt pulley
4 Drive device
5 Transmission device
6.1 First external reader
6.2 Second external reader
7 Evaluation and control unit
8 First marking part of the belt
9 Second marking part of the belt
10 Third marking part of the belt
11 Fourth marking part of the belt
12 Marking part of the belt pulley
A Axis spacing of the belt pulleys
D Spring stiffness
ε Longitudinal extension of the belt
F Free strand length
Fz Tensile force
dFz Difference in tensile force
$L_R$ Circumferential length of the belt
$L_S$ Circumferential length of the belt pulley
M1 Measurement spacing of the first marking part pair
M2 Measurement spacing of the second marking part pair
dM Difference in spacing
R Reference spacing
SM8 Signal from the reader of the first marking part of the belt
SM9 Signal from the reader of the second marking part of the belt
SM10 Signal from the reader of the third marking part of the belt
SM11 Signal from the reader of the fourth marking part of the belt
SM12 Signal from the reader of the marking part of the belt pulley
TR Running time of a marking part of the belt over the circumferential length over one revolution of the belt
dTR Difference between the running times of two consecutive marking parts of a marking part pair
TS Running time of a marking part of the belt pulley over the circumferential length of the belt pulley
TR1 Load strand
TR2 Idle strand
U Circumferential direction
V2 Average belt speed
V3 Speed of the belt pulley
V4 Slip between the belt and the belt pulley

The invention claimed is:

1. A device for ascertaining a longitudinal extension and an average speed (V2) of a belt and for ascertaining a speed (V3) of at least one belt pulley, comprising the belt of predetermined longitudinal stiffness, wherein the length of the belt is constant irrespective of the operating state, wherein the belt has at least a first marking part, a second marking part, a third marking part and a fourth marking part, wherein the first and the second marking part form a first marking part pair and the third and fourth marking part form a second marking part pair, a drive device having at least two belt pulleys of predetermined diameter which are arranged with an axis spacing from each other and around which the belt is at least partially looped, a transmission device comprising at least two external readers and an evaluation and control unit which is suitable for controlling the rotation speed and/or the torque of the drive device, wherein, as the belt revolves, signals (SM8, SM9, SM10, SM11) identifiable at the external readers are generated by each marking part and are output to the evaluation and control unit, wherein the belt is designed to revolve in a circumferential direction in the form of a ring and is driven by the drive device in the circumferential direction, wherein the belt has a load-transmitting load strand and an idle strand arranged opposite to the load strand, wherein, in a state without power transmission, the marking parts of the marking part pairs of the belt are each arranged one behind the other in the circumferential direction with a predetermined reference spacing (R), wherein the reference spacing of the marking parts of the first marking part pair is designed to change into a first measurement spacing when power is transmitted by the belt, wherein the reference spacing of the marking parts of the second marking part pair is designed to change into a second measurement spacing when power is transmitted by the belt, wherein at least one of the belt pulleys has at least one marking part, wherein, as the belt pulley rotates, the marking part of the belt pulley is designed to generate an identifiable signal at one of the external readers and output it to the evaluation and control unit, wherein the transmission device is arranged without contact with the belt in such a way that the marking parts of the marking part pairs of the belt and the belt pulley can be guided past the transmission device in succession, wherein the evaluation and control unit is configured to ascertain a respective running time from in each case two signals, wherein the evaluation and control unit is configured to ascertain an average speed of the belt based on the ascertained running time of one of the marking parts of the marking part pairs over the circumferential length over one revolution of the belt and a speed of the belt pulley based on the ascertained running time of the marking part of the belt pulley, wherein, in a state of the belt without power transmission, at least one marking part pair formed from the marking parts is arranged respectively in the load strand and the idle strand over the circumference of the belt, wherein the evaluation and control unit is configured to ascertain a longitudinal extension of the belt based on the average belt speed, the difference between the running times of the two consecutive marking parts of the marking part pairs of the belt both in the load strand and in the idle strand, and the measurement spacing ascertained therefrom of the marking parts of the marking part pairs from each other both in the load strand and in the idle strand, and the reference spacing as an average value from the ascertained measurement spacings, to ascertain a tensile force and difference in tensile force in the load strand of the belt using the evaluation and control unit via a spring stiffness assigned to the belt and stored in the evaluation and control unit and a difference in spacing of the marking parts of the marking part pairs of the belt in the load strand, and is also configured to ascertain slip between the belt and the belt pulley based on the ratio of the average speeds ascertained from the belt and the belt pulley.

2. The device as claimed in claim 1, wherein the marking parts are designed as surface acoustic wave sensors.

3. The device as claimed in claim 1, wherein the marking parts are RFID transponders.

4. The device as claimed in claim 1, wherein the marking parts are ferromagnetic marking parts.

5. The device as claimed in claim 1, wherein the driven belt pulley has at least one marking part.

6. The device as claimed in claim 1, wherein one of the external readers is arranged in the region of the inlet and one in the region of the outlet of the belt into/out of the belt pulley.

7. The device as claimed in claim 1, wherein when predetermined limit values for slip between the belt and the belt pulley stored in the evaluation and control unit are exceeded, the evaluation and control unit is configured to control the drive torque or the drive speed in such a way that the slip moves to within defined limit values.

8. The device as claimed in claim 1, wherein the evaluation and control unit is coupled to further measuring devices of machine elements and comprises a non-transitory memory for backing up historical sensor data and for backing up historical force profile data relating to the belt, wherein the evaluation and control unit is designed to monitor the historical force profile data relating to the belt within prespecified limit values stored in the non-transitory memory of the evaluation and control unit, and, taking into account the historical sensor data relating to further machine elements from the non-transitory memory of the evaluation and control unit, to draw a conclusion about the wear of machine elements outside the device.

9. The device of claim 1, further comprising an attachment to an agricultural machine.

10. A method for ascertaining a longitudinal extension (E) and an average speed (V2) of a belt and for ascertaining the speed (V3) of at least one belt pulley, comprising the belt with a predetermined longitudinal stiffness, wherein the length of the belt is constant irrespective of the operating state, wherein the belt has at least a first marking part, a second marking part, a third marking part and a fourth marking part, wherein the first and the second marking part form a first marking part pair and the third and fourth marking part form a second marking part pair, a drive device having at least two belt pulleys of predetermined diameter which are arranged with an axis spacing from each other and around which the belt is at least partially looped, a transmission device comprising at least two external readers and an evaluation and control unit which controls the rotation speed and/or the torque of the drive device, wherein, as the belt revolves, signals identifiable at the external readers are generated by each marking part and are output to the evaluation and control unit, wherein the belt revolves in a circumferential direction in the form of a ring and is driven by the drive device in the circumferential direction, wherein the belt has a load strand and an idle strand arranged opposite to the load strand, wherein, in a state without power transmission, the marking parts of the marking part pairs of the belt are each arranged one behind the other in the circumferential direction with a predetermined reference spacing in a non-loaded state of the belt, wherein the reference spacing of the marking parts of the first marking part pair changes into a first measurement spacing when power is transmitted by the belt, wherein the reference spacing of the marking parts of the second marking part pair changes into a second measurement spacing when power is transmitted by the belt, wherein at least one of the belt pulleys has at least one marking part, wherein, as the belt pulley rotates, the marking part of the belt pulley generates an identifiable signal at one of the external readers and outputs it to the evaluation and control unit, wherein the transmission device is arranged without contact with the belt in such a way that the marking parts of the marking part pairs of the belt and the belt pulley are guided past the transmission device in succession, wherein the evaluation and control unit ascertains a running time from in each case two signals, wherein the evaluation and control unit ascertains an average speed of the belt and the belt pulley from the running times, characterized by the following method steps:

a) generating a signal from the first marking part of the belt at the first external reader, b) generating a signal from the second marking part of the belt at the first external reader, c) generating a signal from the third marking part of the belt at the first external reader, d) generating a signal from the fourth marking part of the belt at the first external reader, e) generating a signal from the first marking part of the belt at the second external reader, f) generating a signal from the second marking part of the belt at the second external reader, g) generating a signal from the third marking part of the belt at the second external reader, h) generating a signa from the fourth marking part of the belt at the second external reader, i) ascertaining a running time from in each case two signals using the evaluation and control unit, j) ascertaining the average speed of the belt using the evaluation and control unit based on the ascertained running time of one of the marking parts of the marking part pairs over the circumferential length over one revolution of the belt, k) ascertaining the difference between the running times of the two consecutive marking parts of the marking part pairs of the belt at the external reader assigned to the load strand using the evaluation and control unit, l) ascertaining the measurement spacing of the two consecutive marking parts of the marking part pairs in the load strand via the ascertained average speed of the belt and the ascertained difference between the running times of the two consecutive marking parts of the marking part pairs of the belt, m) ascertaining the difference between the running times of the two consecutive marking parts of the marking part pairs of the belt at the external reader assigned to the idle strand using the evaluation and control unit, n) ascertaining the measurement spacing of the two consecutive marking parts of the marking part pairs in the idle strand via the ascertained average speed of the belt and the ascertained difference between the running times of the two consecutive marking parts of the marking part pairs of the belt, o) ascertaining the difference in spacing of the two consecutive marking parts of the marking part pairs of the belt in the load strand and in the idle strand using the evaluation and control unit, p) ascertaining the reference spacing of the two consecutive marking parts of the marking part pairs of the belt using the evaluation and control unit via the ascertained measurement spacings of the two consecutive marking parts of the marking part pairs of the belt in the load strand and in the idle strand by averaging the measurement spacings, q) ascertaining the longitudinal extension (ε) in the load strand of the belt using the evaluation and control unit via the ascertained measurement spacing of the two consecutive marking parts of the marking part pairs of the belt in the load strand and the ascertained reference spacing, r) ascertaining the longitudinal extension in the load strand of the belt by comparing the ascertained measurement spacing of the marking part pairs in the load strand with the ascertained reference spacing;

s) ascertaining the tensile force and difference in tensile force in the load strand of the belt using the evaluation and control unit via a spring stiffness assigned to the belt and stored in the evaluation and control unit and the difference in spacing of the two consecutive marking parts of the marking part pairs of the belt in the load strand, s) generating a signal from the marking part of the belt pulley at one of the external readers, u) ascertaining a running time of the marking part of the belt pulley from two signals using the evaluation and control unit, v) ascertaining the speed of the belt pulley using the evaluation and control unit based on the ascertained running time of the marking part of the belt pulley over the defined circumference of the belt pulley, w) ascertaining the slip between the belt and the belt pulley using the evaluation and control unit, based on the ascertained speeds of the belt and the belt pulley.

11. The method as claimed in claim 10, wherein when predetermined limit values for slip between the belt and the belt pulley stored in the evaluation and control unit are exceeded, the evaluation and control unit reduces the drive torque or the drive speed, so that the slip moves to within defined limit values.

12. The method of claim 10, wherein the evaluation and control unit stores and saves historical force profile data relating to the belt and further historical sensor data from measuring devices of further machine elements in a non-transitory memory and monitors the historical force profile data relating to the belt within prespecified limit values stored in the non-transitory memory of the evaluation and control unit, wherein, taking into account otherwise ascertained historical sensor data relating to further machine elements from the non-transitory memory of the evaluation and control unit, a conclusion is drawn about the wear of machine elements outside the device.

13. The method of claim 10, further comprising monitoring belt-driven devices on attachments of an agricultural machine.

14. A device for ascertaining a belt longitudinal extension and an average belt speed, the device comprising:

a belt having a first marking part, a second marking part, a third marking part and a fourth marking part, the first and the second marking part form a first marking part pair and the third and fourth marking part form a second marking part pair;

a drive device having at least two belt pulleys of predetermined diameter which are arranged with an axis spacing from each other and around which the belt is at least partially looped;

a transmission device configured to generate marking signals for each marking part;

a load transmitting strand of the belt and an idle strand of the belt;

a control unit configured to:

determine running times of the first marking pair and the second marking pair based on the marking signals;

determine a measurement spacing of the first marking pair and the second marking pair based on the determined running times and belt speed;

determine a longitudinal extension of the belt by comparing the determined measurement spacing with a reference spacing;

determine a tensile force of the load strand based on a spring stiffness assigned to the belt and spacings of the first marking pair and the second marking pair;

determine a belt speed of the belt based on the marking signals;

determine a pulley speed of the belt pulleys; and determine a slip between the belt and a belt pulley based on the belt speed and the pulley speed.

15. The device of claim 14, the belt is a toothed belt.

16. The device of claim 14, the marking parts are tags.

17. The device of claim 16, the marking parts comprise surface acoustic wave sensors (SAW) that are rated for temperatures of more than 200 degrees Celsius.

18. The device of claim 17, the marking parts receive energy from an external reader of the control unit.

19. The device of claim 18, the control unit further comprises a non-transitory memory and stores historical force profile data of the belt in the non-transitory memory.

* * * * *